US011227606B1

(12) United States Patent
Ramprashad et al.

(10) Patent No.: US 11,227,606 B1
(45) Date of Patent: Jan. 18, 2022

(54) COMPACT, VERIFIABLE RECORD OF AN AUDIO COMMUNICATION AND METHOD FOR MAKING SAME

(71) Applicant: MEDALLIA, INC., San Francisco, CA (US)

(72) Inventors: Wayne Ramprashad, Pittsburgh, PA (US); David Garrod, Pittsburgh, PA (US)

(73) Assignee: Medallia, Inc., San Francisco, CA (US)

( * ) Notice: Subject to any disclaimer, the term of this patent is extended or adjusted under 35 U.S.C. 154(b) by 0 days.

(21) Appl. No.: 16/589,071

(22) Filed: Sep. 30, 2019

Related U.S. Application Data

(63) Continuation-in-part of application No. 16/458,367, filed on Jul. 1, 2019, and a continuation-in-part of
(Continued)

(51) Int. Cl.
G10L 17/06 (2013.01)
G10L 25/63 (2013.01)
G10L 17/04 (2013.01)

(52) U.S. Cl.
CPC .............. *G10L 17/06* (2013.01); *G10L 17/04* (2013.01); *G10L 25/63* (2013.01)

(58) Field of Classification Search
CPC .............. G06Q 30/0601; G06Q 10/10; G06Q 20/40145; G06Q 40/08; G10L 15/1815; G10L 17/04; G10L 17/06; G10L 17/24; G10L 25/63; G10L 15/26; G10L 17/00; G10L 17/02; G10L 21/10; G10L 17/22; H04N 7/15; G06F 21/32; G06F 40/186; G06F 40/279; G06N 7/005; H04L 41/5054; H04L 63/0407; H04M 3/51; H04M 3/5191
(Continued)

(56) References Cited

U.S. PATENT DOCUMENTS 7,660,715 B1 * 2/2010 Thambiratnam ....... G10L 15/22
704/244
7,738,638 B1 * 6/2010 Henderson ............ H04M 7/006
379/88.17
(Continued)

FOREIGN PATENT DOCUMENTS

KR 1020180057446 A 5/2018
KR 1020180092582 A 8/2018

OTHER PUBLICATIONS

PCT Search Report and Written Opinion dated Aug. 26, 2021 PCT/US2020/070944. 10 pages.

*Primary Examiner* — Gerald Gauthier

(57) ABSTRACT

A compact, self-authenticating, and speaker-verifiable record of an audio communication involving one or more persons comprises a record, encoded on a non-transitory, computer-readable medium, that consists essentially of: a voiceprint for each person whose voice is encoded in the record; a plurality of transcription records, where each transcription record consists essentially of a computer-generated speech-to-text decoding of an utterance and voiceprint associating information that associates a speaker of the utterance with one of the voiceprints stored in the record; and self-authenticating information sufficient to determine whether any of the information encoded in the communication record has been altered.

20 Claims, 6 Drawing Sheets

Related U.S. Application Data application No. 16/371,014, filed on Mar. 31, 2019, now Pat. No. 10,872,615.

(58) Field of Classification Search
USPC .......... 370/389; 379/88.17, 88.08; 704/235, 704/236, 244, 2, 243; 705/311, 35; 713/175, 171; 726/28
See application file for complete search history.

(56) References Cited

U.S. PATENT DOCUMENTS

| | | | |
|---|---|---|---|
| 7,774,202 B2* | 8/2010 | Spengler | G10L 15/22 704/236 |
| 8,165,114 B2* | 4/2012 | Halbraich | H04L 12/66 370/389 |
| 8,204,053 B1* | 6/2012 | Williams | H04L 65/1083 370/389 |
| 10,074,089 B1* | 9/2018 | Rangaraj | G10L 17/00 |
| 10,332,508 B1* | 6/2019 | Hoffmeister | G06N 3/084 |
| 10,332,517 B1* | 6/2019 | Wang | G06F 3/167 |
| 10,516,777 B1* | 12/2019 | Kalkundrikar | G10L 15/26 |
| 10,554,817 B1* | 2/2020 | Sullivan | G06N 5/02 |
| 10,872,615 B1* | 12/2020 | Garrod | H03M 7/60 |
| 10,977,734 B1* | 4/2021 | Kenney | G06Q 40/08 |
| 2006/0195320 A1* | 8/2006 | Carpenter | G06N 20/00 704/243 |
| 2006/0242038 A1* | 10/2006 | Giudilli | G06Q 20/1235 705/35 |
| 2012/0036364 A1* | 2/2012 | Yoneda | H04L 9/3249 713/175 |
| 2014/0156545 A1* | 6/2014 | Clapham | G06Q 50/18 705/311 |
| 2014/0192966 A1* | 7/2014 | Zhang | H04M 3/42221 379/88.08 |
| 2014/0297252 A1* | 10/2014 | Prasad | G10L 15/01 704/2 |
| 2014/0325225 A1* | 10/2014 | Liu | H04L 9/3297 713/171 |
| 2014/0330563 A1* | 11/2014 | Faians | G10L 17/22 704/236 |
| 2015/0348540 A1* | 12/2015 | Ljolje | G10L 15/01 704/235 |
| 2015/0371631 A1 | 12/2015 | Weinstein et al. | |
| 2015/0371633 A1 | 12/2015 | Chelba | |
| 2016/0132693 A1* | 5/2016 | Kumar | G10L 17/00 726/28 |
| 2016/0284354 A1* | 9/2016 | Chen | H04N 7/147 |
| 2016/0372121 A1* | 12/2016 | Li | G10L 17/14 |
| 2017/0011233 A1* | 1/2017 | Xue | G10L 15/30 |
| 2017/0092297 A1 | 3/2017 | Sainath et al. | |
| 2017/0140174 A1* | 5/2017 | Lacey | G06F 21/6245 |
| 2018/0089412 A1* | 3/2018 | Kopikare | G06K 9/00006 |
| 2018/0137865 A1* | 5/2018 | Ling | G10L 17/14 |
| 2018/0158464 A1* | 6/2018 | Sidi | G10L 25/78 |
| 2018/0324293 A1* | 11/2018 | Davis | G10L 19/018 |
| 2019/0013038 A1* | 1/2019 | Thomson | H04L 63/0414 |
| 2020/0211561 A1* | 7/2020 | Degraye | G06Q 10/10 |
| 2020/0312337 A1* | 10/2020 | Stafylakis | G10L 15/08 |

* cited by examiner

| Transcription record 1 | vp1 |
| Transcription record 2 | vp2 |
| Transcription record 3 | vp1 |
| ... | |
| vp1 | Voiceprint #1 |
| vp1 | Voiceprint #1 |
| Self-authentication info | |

FIG. 2

| Transcription record 1 | vp1 |
| Transcription record 2 | vp2 |
| Transcription record 3 | vp1 |
| Transcription record 4 | vp3 |
| Transcription record 5 | vp1 |
| Transcription record 6 | vp3 |
| ... | |
| vp1 | Voiceprint #1 |
| vp2 | Voiceprint #2 |
| vp3 | Voiceprint #3 |
| Self-authentication info | |

FIG. 3

| |
|---|
| Transcription record 1      vp1 |
| Meta-data record 1 |
| Transcription record 2      vp2 |
| Meta-data record 2 |
| Transcription record 3      vp1 |
| Meta-data record 3 |
| ... |
| vp1      Voiceprint #1 |
| vp2      Voiceprint #2 |
| Self-authentication info |

FIG. 4

| | |
|---|---|
| Transcription record 1 | vp1 |
| Transcription record 2 | vp2 |
| Transcription record 3 | vp1 |
| ... | |
| vp1 | Voiceprint #1 |
| Sample audio data (vp1) | |
| vp2 | Voiceprint #2 |
| Sample audio data (vp2) | |
| Self-authentication info | |

FIG. 5

| | |
|---|---|
| Transcription record 1 | vp1 |
| Meta-data record 1 | |
| Transcription record 2 | vp2 |
| Meta-data record 2 | |
| Transcription record 3 | vp1 |
| Meta-data record 3 | |
| Low-conf. audio data (tr3) | |
| ••• | |
| vp1 | Voiceprint #1 |
| vp2 | Voiceprint #2 |
| Self-authentication info | |

FIG. 6

COMPACT, VERIFIABLE RECORD OF AN AUDIO COMMUNICATION AND METHOD FOR MAKING SAME

CROSS-REFERENCE TO RELATED APPLICATION(S)

This application is a continuation-in-part of U.S. patent application Ser. No. 16/458,367, entitled "Direct-to-Transcription ASR to Produce Multiple, Differently Redacted Real-Time Feeds in Multiple Security Zones," filed Jul. 1, 2019, which '367 application is incorporated by reference herein.

This application is also a continuation-in-part of U.S. patent application Ser. No. 16/371,011, entitled "On-The-Fly Transcription/Redaction Of Voice-Over-IP Calls," filed Mar. 31, 2019, which '011 application is incorporated by reference herein.

This application is also a continuation-in-part of U.S. patent application Ser. No. 16/371,014, entitled "ASR-Enhanced Speech Compression/Archiving," filed Mar. 31, 2019, which '014 application is incorporated by reference herein.

And this application is also a continuation-in-part of U.S. patent application Ser. No. 16/162,997, entitled "Use of ASR Confidence to Improve Reliability of Automatic Audio Redaction," filed Oct. 17, 2018, which '997 application is incorporated by reference herein.

BACKGROUND OF THE INVENTION

Modern telephony operates using the voice-over-IP (VoIP) protocol. Call capture/recording technology is widely deployed on VoIP networks. Such technology is available from many vendors, including AT&T, NICE, and Verint. See, e.g., U.S. Pat. Nos. 7,738,638, "Voice over internet protocol call recording" (AT&T), 8,165,114, "Voice over IP capturing" (NICE), and 8,204,053, "Systems and methods for providing network services for recording" (Verint).

Routine call capture/recording serves several business needs. In some industries (e.g., financial services), there exist legal requirements that some or all customer calls be recorded and maintained for a number of (e.g., seven) years. But even in industries/environments where call recording is not required, businesses find it useful to drive internal business functions.

For example, recorded calls can be transcribed—using a large-vocabulary speech-to-text engine, such as the assignee's V-Blaze engine, a phonetic recognition engine, or a pool of human transcribers—with the resulting text used to feed a text analytics engine, either alone or in combination with other text sources, such as chat, social media, and web. Additionally, recorded calls can be analyzed for trend-spotting issues such as agent performance (e.g., compliance with recommended scripts), agent malperformance (e.g., agent use of swear words, or negative vocal tone), customer dissatisfaction (e.g., customer use of swear words, or negative vocal tone), and agent compliance with legal requirements (e.g., the so-called mini-Miranda warning that debt collectors are required to issue). Finally, in the event of a specific customer complaint or dispute (e.g., "I didn't order that . . . " or "the agent was rude"), the recorded call provides the ultimate record from which a supervisor can investigate and resolve such issues.

While archives of recorded calls serve many useful functions, they also create some well-known problems for their owners. One basic challenge is storage capacity. A typical large enterprise might service millions of calls per day, which can quickly produce immense quantities of data—especially if the calls are recorded in an uncompressed or lightly compressed format. Traditionally, the approach has been to store the recorded calls in a highly compressed format. However, this "solution" poses its own challenges, as such highly compressed calls are difficult to understand, even by human transcribers, but especially by automatic speech recognition (ASR) engines.

Another well-known challenge posed by large archives of recorded calls is the inability to effectively search them, or even to know what information they might contain. This becomes particularly troublesome in the event of government investigations or civil litigation. In such cases, the archive owner might be required to produce, to the investigative agency or opposing litigation party, "all calls in which a prospective client or employee was asked whether s/he had any disability." In such a circumstance, it is not an adequate solution for the archive owner simply to produce everything in the archive.

With improvement in the accuracy of state-of-the-art ASR, it is becoming increasingly feasible to consider the possibility of storing just transcripts, and not storing or archiving voice recordings at all. While this would have obvious advantages in terms of compactness and searchability, it would also have less obvious drawbacks. One potential drawback concerns the identity of the person speaking ("that wasn't me who said that!"). Another possible drawback is the perceived ease with which a transcript could be altered. Still another possible drawback would be disagreements over prosodic aspects not captured in the stored transcript ("I wasn't yelling"; "I wasn't speaking with a negative tone").

Thus, there remains a substantial need for improved articles for and methods of audio storage and archiving that address these non-obvious deficiencies in currently deployed and/or deployable systems.

OBJECTS AND SUMMARY OF THE INVENTION

One object of the invention relates to a highly compact and verifiable means for recording an audio communication and to a process for implementing such.

Another object of the invention relates to verifiable audio transcripts that contain selected meta-data and to processes for creating such.

According to certain embodiments of the invention, a compact, self-authenticating, and speaker-verifiable record of an audio communication involving one or more persons comprises a record, encoded on a non-transitory, computer-readable medium, that consists essentially of: a voiceprint for each person whose voice is encoded in the record; a plurality of transcription records, where each transcription record consists essentially of a computer-generated STT decoding of an utterance and voiceprint associating information that associates a speaker of the utterance with one of the voiceprints stored in the record; and self-authenticating information sufficient to determine whether any of the information encoded in the communication record has been altered. In some embodiments, the communication record may further consist essentially of meta-data associated with each transcription record. In some embodiments, the meta-data includes a confidence score that indicates a likelihood that the corresponding transcription record contains an accurate STT decoding of the corresponding utterance. In some embodiments, the meta-data further includes at least one of: a timestamp that indicates a starting time of the corresponding utterance; a duration of the utterance; role identification information that indicates the status of the utterance speaker (for example, as an agent or a caller); utterance overtalk information; utterance volume information; acoustically derived utterance emotion information; automatic number identification (ANI) information; and/or dialed number identification system (DNIS) information. In some embodiments, the self-authenticating information comprises a message authentication code (MAC). In some embodiments, the MAC comprises one of an MD5, SH-1, SH-2, or SH-3 code computed from the contents of the communication record. In some embodiments, the communication record includes at least two voiceprints. In some embodiments, the voiceprints are derived using one of: frequency estimation, hidden Markov models, Gaussian mixture models, pattern matching algorithms, neural networks, matrix representation, vector quantization, or decision trees. In some embodiments, the communication record further consists essentially of audio data from which each voiceprint in the communication record was derived. In some embodiments, the communication record further consists essentially of audio data whose corresponding transcription confidence score is below a predetermined likelihood of accuracy threshold.

According to other embodiments of the invention, a process for creating a compact, self-authenticating, and speaker-verifiable record of an audio communication session involving one or more persons includes: creating a voiceprint for each new person whose voice is detected during the communication session; performing ASR decoding to create a plurality of transcription records, each transcription record consisting essentially of an ASR decoded utterance and voiceprint associating information that associates a speaker of the utterance with one of the previously created voiceprints; and creating the compact, self-authenticating, and speaker-verifiable record of the audio communication session by storing the voiceprints and transcription records, along self-authenticating information sufficient to determine whether any of them have been altered, in a non-transitory, computer-readable medium. In some embodiments, the process further comprises associating meta-data with each transcription record; and storing said meta-data, along with the voiceprints, transcription records, and self-authenticating information, in the non-transitory, computer-readable medium. In some embodiments, associating meta-data with each transcription record comprises computing and associating a confidence score that indicates a likelihood that the corresponding transcription record contains an accurate ASR decoding of the corresponding utterance. In some embodiments, associating meta-data with each transcription record comprises associating at least one of: a timestamp that indicates a starting time of the corresponding utterance; a duration of the utterance; role identification information; utterance overtalk information; utterance volume information; acoustically derived utterance emotion information; ANI information; and/or DNIS information. In some embodiments, the self-authenticating information comprises a MAC. In some embodiments, the MAC comprises one of an MD5, SH-1, SH-2, or SH-3 code computed from the contents of the record. In some embodiments, the process creates at least two voiceprints. In some embodiments, creating the voiceprints involves use of frequency estimation, hidden Markov models, Gaussian mixture models, pattern matching algorithms, neural networks, matrix representation, vector quantization, or decision trees. In some embodiments, creating the compact, self-authenticating, and speaker-verifiable record of the audio communication session involves storing the voiceprints, transcription records, and audio data from which each voiceprint was derived, along self-authenticating information sufficient to determine whether any of them have been altered, in the non-transitory, computer-readable medium. And in some embodiments, any audio data whose corresponding transcription confidence score is below a predetermined likelihood of accuracy threshold is also stored, along with the audio data, meta-data, voiceprints, transcription records, and self-authenticating information, in the non-transitory, computer-readable medium.

BRIEF DESCRIPTION OF THE FIGURES

These, as well as other, aspects, features, and advantages of the present invention are shown in the accompanying set of figures, in which:

FIG. 2 depicts a first exemplary audio communication record in accordance with one embodiment of the invention;

FIG. 3 depicts a second exemplary audio communication record in accordance with another embodiment of the invention;

FIG. 4 depicts a third exemplary audio communication record in accordance with another embodiment of the invention;

FIG. 5 depicts a fourth exemplary audio communication record in accordance with another embodiment of the invention; and, FIG. 6 depicts a fifth exemplary audio communication record in accordance with another embodiment of the invention.

DESCRIPTION OF THE PREFERRED EMBODIMENT(S)

Figure 1:
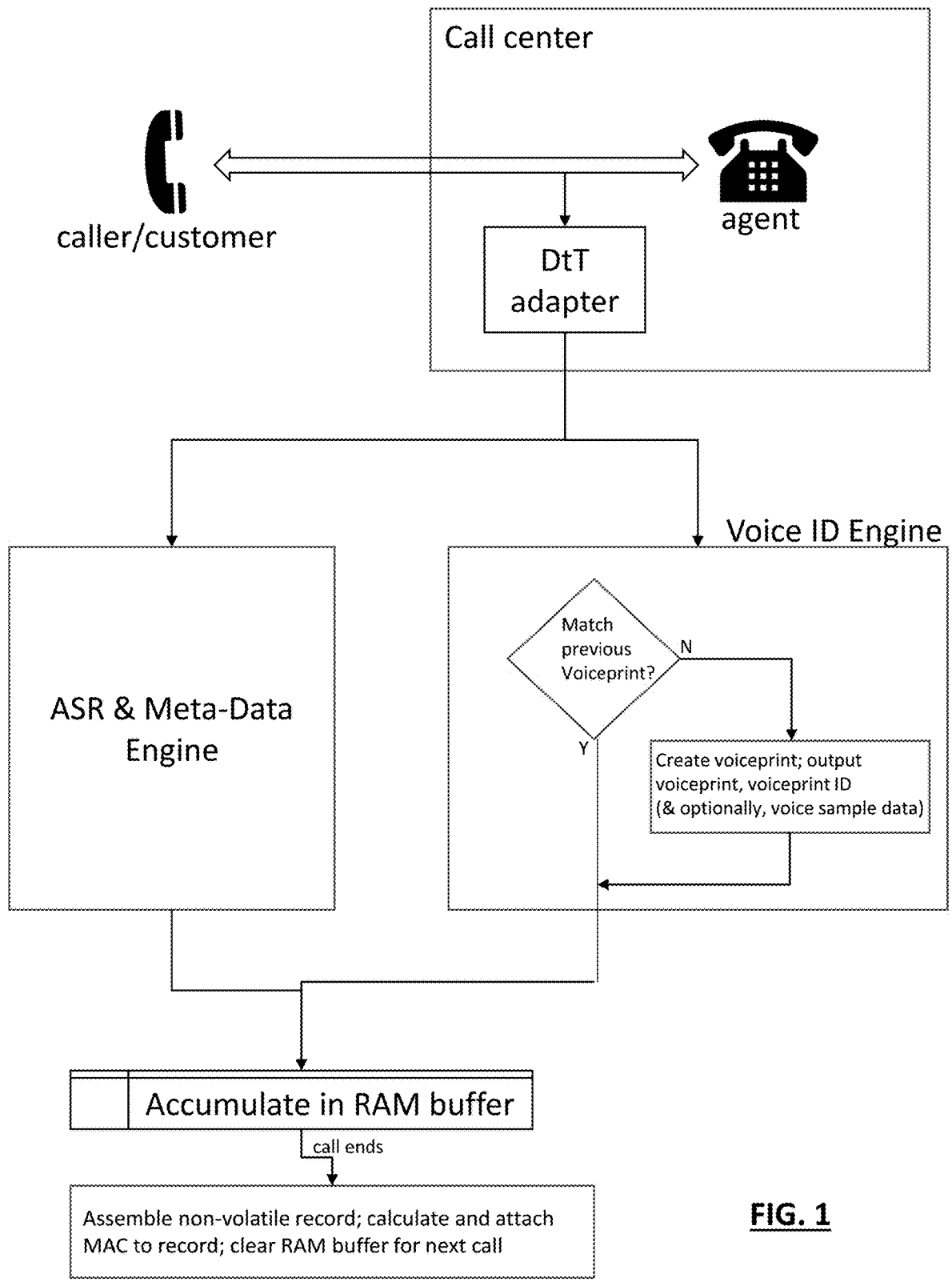
FIG. 1 depicts an overall flow for making compact, verifiable records of telephonic audio communications in accordance with certain embodiments of the invention.

Reference is now made to FIG. 1, which depicts an overall flow for making compact, verifiable records of telephonic audio communications in accordance with certain embodiments of the invention. The depicted embodiment utilizes a direct-to-transcription (DtD) adapter, as described in the incorporated '011 and '367 applications, to capture live audio in real time; however, it should be understood that the invention herein is equally amenable to use of recorded audio as an input source.

As depicted, the ASR & Meta-Data Engine performs the STT processing and (optional) meta-data extraction/computation, while the Voice ID Engine identifies new speaker(s) and calculates their voiceprint(s). While depicted as part of the ASR Engine, it should be appreciated that the (optional) meta-data extraction and/or computation tasks could be performed within the Voice ID Engine, or in one or more separate functional module(s).

After computation/extraction of the call data, the processed/extracted data is accumulated in a (preferably) non-volatile buffer. Once the call (or call recording) ends, the accumulated data is used to assemble the communication record, the buffer is reset, and the process continues with the next call.

Reference is now made to FIG. 2, which depicts a first exemplary audio communication record in accordance with one embodiment of the invention. This shows an example of a two-party call record, without meta-data. Each transcription record contains a corresponding voiceprint ID (i.e., vp1 or vp2) that associates the speaker with his/her voiceprint.

Reference is now made to FIG. 3, which depicts a second exemplary audio communication record in accordance with another embodiment of the invention. Here, the archived call is show as having three parties (by the presence of voice-prints 1, 2, and 3).

Reference is now made to FIG. 4, which depicts a third exemplary audio communication record in accordance with another embodiment of the invention. This is an example of a two-party call record, with meta-data. As shown, there is a meta-data record associated with each transcription record. Such meta-data records can contain extracted or computed meta-data, such as: a timestamp that indicates a starting time of the corresponding utterance; a duration of the utterance; role identification information; utterance overtalk information; utterance volume information; acoustically derived utterance emotion information; ANI information; and/or DNIS information.

Reference is now made to FIG. 5, which depicts a fourth exemplary audio communication record in accordance with another embodiment of the invention. Here, the record includes the audio from which each stored voiceprint is/was created.

And reference is now made to FIG. 6, which depicts a fifth exemplary audio communication record in accordance with another embodiment of the invention. In this embodiment, audio data that was transcribed with low confidence is automatically included in the communication record, as can be see with transcription record 3.

As those skilled in the art will appreciate, variations and mixtures of these embodiments and their features is possible. Hence, the scope of this invention should not be limited to the specific embodiments shown, but rather to the claims that follow.

What we claim in this application is:

1. A compact, self-authenticating, and speaker-verifiable record of an audio communication involving one or more persons, said communication record encoded on a non-transitory, computer-readable medium and consisting essentially of:
   a voiceprint for each person whose voice is encoded in said record;
   a plurality of transcription records, each transcription record consisting essentially of a computer-generated speech-to-text (STT) decoding of an utterance and voiceprint associating information that associates a speaker of said utterance with one of the voiceprints stored in said record; and,
   self-authenticating information sufficient to determine whether any of the information encoded in said communication record has been altered.

2. A communication record, encoded on a non-transitory, computer-readable medium, as defined in claim 1, wherein said communication record further consists essentially of:
   meta-data associated with each transcription record.

3. A communication record, encoded on a non-transitory, computer-readable medium, as defined in claim 2, wherein said meta-data includes a confidence score that indicates a likelihood that the corresponding transcription record contains an accurate STT decoding of the corresponding utterance.

4. A communication record, encoded on a non-transitory, computer-readable medium, as defined in claim 2, wherein said meta-data further includes at least one of:
   a timestamp that indicates a starting time of the corresponding utterance;
   a duration of the utterance;
   role identification information that indicates the status of the utterance speaker as an agent or a caller;
   utterance overtalk information;
   utterance volume information;
   acoustically derived utterance emotion information;
   automatic number identification (ANI) information; and,
   dialed number identification system (DNIS) information.

5. A communication record, encoded on a non-transitory, computer-readable medium, as defined in claim 1, wherein said self-authenticating information comprises a message authentication code (MAC).

6. A communication record, encoded on a non-transitory, computer-readable medium, as defined in claim 5, wherein said MAC comprises one of an MD5, SH-1, SH-2, or SH-3 code computed from the contents of said communication record.

7. A communication record, encoded on a non-transitory, computer-readable medium, as defined in claim 1, wherein said communication record includes at least two voiceprints.

8. A communication record, encoded on a non-transitory, computer-readable medium, as defined in claim 7, wherein said voiceprints are derived using one of: frequency estimation, hidden Markov models, Gaussian mixture models, pattern matching algorithms, neural networks, matrix representation, vector quantization, or decision trees.

9. A communication record, encoded on a non-transitory, computer-readable medium, as defined in claim 7, wherein said communication record further consists essentially of audio data from which each voiceprint in said communication record was derived.

10. A communication record, encoded on a non-transitory, computer-readable medium, as defined in claim 3, wherein said communication record further consists essentially of audio data whose corresponding transcription confidence score is below a predetermined likelihood of accuracy threshold.

11. A process for creating a compact, self-authenticating, and speaker-verifiable record of an audio communication session involving one or more persons, said process comprising:
    creating a voiceprint for each new person whose voice is detected during the communication session;
    performing automatic speech recognition (ASR) decoding to create a plurality of transcription records, each transcription record consisting essentially of an ASR decoded utterance and voiceprint associating information that associates a speaker of said utterance with one of the previously created voiceprints; and,
    creating the compact, self-authenticating, and speaker-verifiable record of the audio communication session by storing the voiceprints and transcription records, along self-authenticating information sufficient to determine whether any of them have been altered, in a non-transitory, computer-readable medium.

12. A process, as defined in claim 11, further comprising:
    associating meta-data with each transcription record; and,
    storing said meta-data, along with the voiceprints, transcription records, and self-authenticating information, in the non-transitory, computer-readable medium.

13. A process, as defined in claim 12, wherein:
    associating meta-data with each transcription record comprises computing and associating a confidence score that indicates a likelihood that the corresponding transcription record contains an accurate ASR decoding of the corresponding utterance.

14. A process, as defined in claim 12, wherein:
associating meta-data with each transcription record comprises associating at least one of:
- a timestamp that indicates a starting time of the corresponding utterance;
- a duration of the utterance;
- role identification information that indicates the status of the utterance speaker as an agent or a caller;
- utterance overtalk information;
- utterance volume information;
- acoustically derived utterance emotion information;
- automatic number identification (ANI) information; and,
- dialed number identification system (DNIS) information.

15. A process, as defined in claim 11, wherein said self-authenticating information comprises a message authentication code (MAC).

16. A process, as defined in claim 15, wherein said MAC comprises one of an MD5, SH-1, SH-2, or SH-3 code computed from the contents of said record.

17. A process, as defined in claim 11, wherein the process creates at least two voiceprints.

18. A process, as defined in claim 17, wherein creating the voiceprints involves use of: frequency estimation, hidden Markov models, Gaussian mixture models, pattern matching algorithms, neural networks, matrix representation, vector quantization, or decision trees.

19. A process, as defined in claim 17, wherein:
creating the compact, self-authenticating, and speaker-verifiable record of the audio communication session involves storing the voiceprints, transcription records, and audio data from which each voiceprint was derived, along self-authenticating information sufficient to determine whether any of them have been altered, in the non-transitory, computer-readable medium.

20. A process, as defined in claim 13, wherein for any audio data whose corresponding transcription confidence score is below a predetermined likelihood of accuracy threshold, said process further involves storing said audio data, along with said meta-data, voiceprints, transcription records, and self-authenticating information, in the non-transitory, computer-readable medium.

* * * * *